(12) United States Patent
Koitabashi et al.

(10) Patent No.: US 12,544,954 B2
(45) Date of Patent: Feb. 10, 2026

(54) KNEADING ROTOR, KNEADING MACHINE, METHOD FOR KNEADING RUBBER MATERIAL, AND METHOD FOR MANUFACTURING KNEADING ROTOR

(71) Applicant: KOBE STEEL, LTD., Hyogo (JP)

(72) Inventors: Tsutomu Koitabashi, Takasago (JP); Ryuichi Kobayashi, Takasago (JP); Yasuyuki Sugita, Takasago (JP); Masao Murakami, Takasago (JP)

(73) Assignee: KOBE STEEL, LTD., Hyogo (JP)

( * ) Notice: Subject to any disclaimer, the term of this patent is extended or adjusted under 35 U.S.C. 154(b) by 950 days.

(21) Appl. No.: 17/659,780

(22) Filed: Apr. 19, 2022

(65) Prior Publication Data
US 2022/0347887 A1    Nov. 3, 2022

(30) Foreign Application Priority Data

Apr. 28, 2021   (JP) .................................. 2021-075811

(51) Int. Cl.
| | | |
|---|---|---|
| *B29B 7/18* | (2006.01) | |
| *B29B 7/20* | (2006.01) | |
| *B29B 7/82* | (2006.01) | |

(52) U.S. Cl.
CPC ................ *B29B 7/186* (2013.01); *B29B 7/20* (2013.01); *B29B 7/82* (2013.01)

(58) Field of Classification Search
CPC . B29C 48/682; B29C 48/6801; B29C 48/685; B29C 48/40; B29C 48/6803; B29C 48/68; B29C 48/402; B29C 48/57; B29B 7/186; B29B 7/20; B29B 7/82; B29B 7/183; B29B 7/22; B29B 7/283; B29B 7/7495; B29B 7/826; B23P 15/00
USPC .................................................... 366/69–100
See application file for complete search history.

(56) References Cited

U.S. PATENT DOCUMENTS

| | | | | |
|---|---|---|---|---|
| 944,717 | A | * 12/1909 | Caul | ...................... F02M 69/00 261/DIG. 7 |
| 1,101,199 | A | * 6/1914 | Legg et al. | ......... B01F 27/8111 366/328.3 |
| 1,841,434 | A | * 1/1932 | Gibson | ............... B01F 27/1125 366/129 |
| 4,402,454 | A | * 9/1983 | Ty | .......................... F23N 3/047 428/617 |
| 4,856,907 | A | 8/1989 | Moriyama | |
| 4,936,688 | A | * 6/1990 | Cornell | ............... B01F 27/2121 99/348 |
| 5,984,516 | A | 11/1999 | Inoue et al. | |

(Continued)

FOREIGN PATENT DOCUMENTS

| | | |
|---|---|---|
| CA | 1283403 C | 4/1991 |
| CN | 206633252 U | 11/2017 |

(Continued)

*Primary Examiner* — Charles Cooley
(74) *Attorney, Agent, or Firm* — Studebaker Brackett PLLC

(57) ABSTRACT

The kneading rotor according to one aspect of the present disclosure is a kneading rotor for a kneading machine, comprising a base made of carbon steel or alloy steel for machine structure, a padded layer made of austenitic stainless steel on at least part of a surface of the base and has a hard chromium plated layer on at least part of a surface of the padded layer.

9 Claims, 5 Drawing Sheets

(56) References Cited

U.S. PATENT DOCUMENTS

| | | | | |
|---|---|---|---|---|
| 6,886,974 B1 * | 5/2005 | Millan | .................... | B01F 27/88 |
| | | | | 366/605 |
| 7,063,454 B2 * | 6/2006 | Murakami | ........... | A21C 1/1495 |
| | | | | 366/147 |
| 2002/0126573 A1 | 9/2002 | Schubert | | |
| 2022/0266475 A1 | 8/2022 | Dussardier et al. | | |
| 2022/0347887 A1 * | 11/2022 | Koitabashi | .............. | B29B 7/186 |

FOREIGN PATENT DOCUMENTS

| | | | | |
|---|---|---|---|---|
| CN | 206748803 U | | 12/2017 | |
| DE | 100 48 870 A1 | | 5/2002 | |
| EP | 0 848 988 A2 | | 6/1998 | |
| JP | H11-58369 A | | 3/1999 | |
| JP | 2000-045093 A | | 2/2000 | |
| JP | 2005059528 A | * | 3/2005 | ........... B29C 47/366 |
| JP | 2005144716 A | * | 6/2005 | ........... B29C 47/366 |
| JP | 2006026991 A | * | 2/2006 | ........... B29C 47/366 |
| JP | 2008-246479 A | | 10/2008 | |
| WO | 2019/181085 A1 | | 9/2019 | |

\* cited by examiner

KNEADING ROTOR, KNEADING MACHINE, METHOD FOR KNEADING RUBBER MATERIAL, AND METHOD FOR MANUFACTURING KNEADING ROTOR

FIELD OF THE INVENTION

The present disclosure relates to a kneading rotor for kneading a rubber material, a kneading machine including the kneading rotor, a method for kneading a rubber material using the kneading machine, and a method for manufacturing the kneading rotor.

BACKGROUND ART

A large load is applied to a kneading rotor used in a kneading machine for a rubber material during kneading as compared with a kneading rotor used in a kneading machine for a powder or the like. The surface of the kneading rotor is worn by a rubber material during kneading. For this reason, in a kneading rotor used in a kneading machine for a rubber material, for example, carbon steel having sufficient strength is used, for a base having a shaft portion and a kneading blade. Further, a hard chromium plated layer having abrasion resistance is formed on a surface of the base. For example, Japanese Patent Application Laid-Open No. 2000-45093 (Patent Literature 1) discloses a method for plating a rotor for a rubber kneading machine.

In recent years, kneading of a rubber material containing a large amount of silica has been required. When such a rubber material is kneaded, an acidic aqueous solution may be generated in the rubber material due to moisture contained in silica. Since a hard chromium plated layer is porous, the generated acidic aqueous solution penetrates into the hard chromium plated layer during kneading. Since carbon steel constituting a base is inferior in corrosion resistance, an acidic aqueous solution penetrating into the hard chromium plated layer may corrode the base.

For this reason, in order to suppress corrosion of a base, conventionally, Stellite (registered trademark) superior in corrosion resistance is overlay welded onto a surface of a base of a kneading rotor to form a hard chromium plated layer on the surface of the Stellite.

However, Stellite is an expensive alloy containing cobalt as a main component, and cobalt has a problem that it is unfavorable for the health of the human body. For this reason, there is a demand for reducing the amount of Stellite to be used.

The present disclosure was made in view of such problems and requirements, and an object thereof is to provide an inexpensive and safe kneading rotor superior in corrosion resistance and abrasion resistance. Another object is to provide a kneading machine including the kneading rotor, a method for kneading a rubber material using the kneading machine, and a method for manufacturing the kneading rotor.

SUMMARY OF THE INVENTION

The kneading rotor according to one aspect of the present disclosure is a kneading rotor for a kneading machine, comprising a base made of carbon steel or alloy steel for machine structure, a padded layer made of austenitic stainless steel on at least part of a surface of the base and has a hard chromium plated layer on at least part of a surface of the padded layer.

DESCRIPTION OF EMBODIMENTS

In the following, embodiments of the present disclosure will be described in detail. The scope of the present invention is not limited to the embodiment described herein, and various modifications can be made unless the gist of the present disclosure is impaired.

First Embodiment

Kneading Rotor

Figure 1:
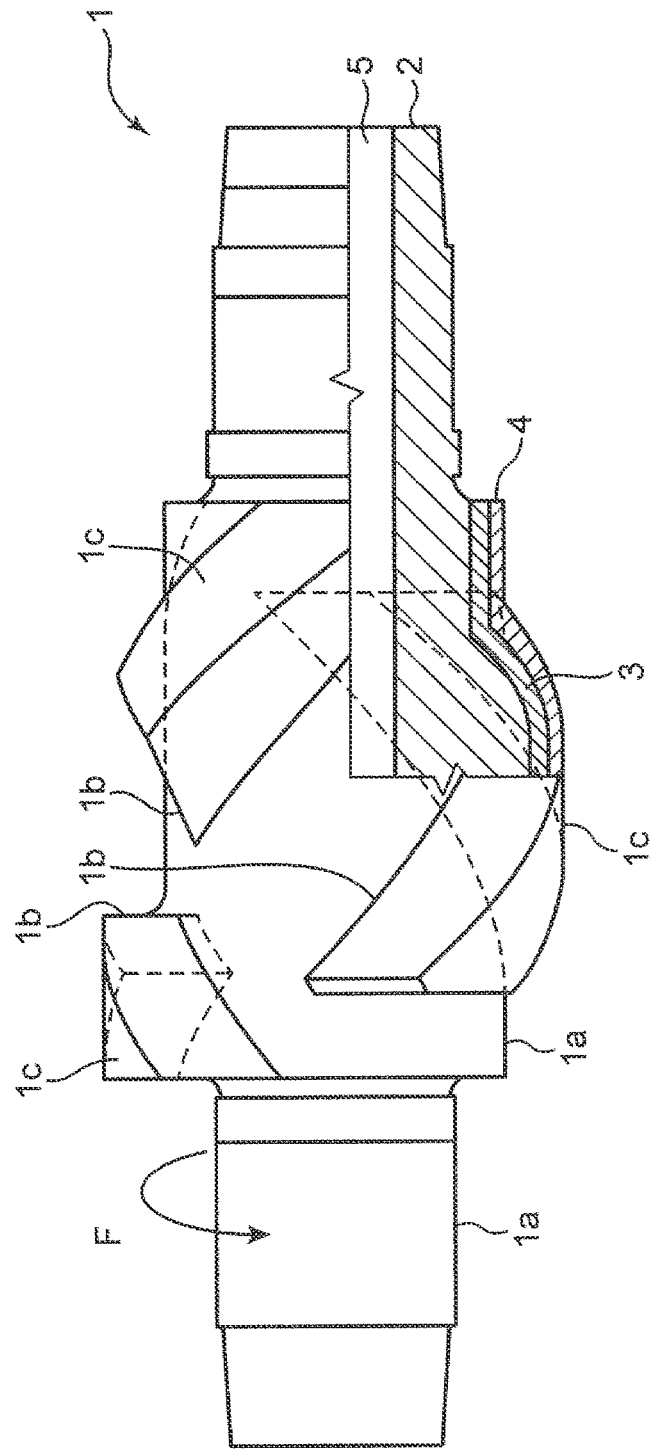
FIG. 1 is a partial cross-sectional view of a kneading rotor according to a first embodiment of the present disclosure.

FIG. 1 is a partial cross-sectional view of a kneading rotor according to the present embodiment. The kneading rotor 1 is a kneading rotor for a kneading machine and, as illustrated in a cross-sectional portion of FIG. 1, has a base 2, a padded layer 3 provided on at least part of a surface of the base 2, and a hard chromium plated layer 4 provided on at least part of a surface of the padded layer 3.

The base 2 is made of carbon steel or alloy steel for machine structure, and has a portion constituting a shaft portion 1a and a kneading blade 1 b. As the carbon steel constituting the base 2, common carbon steel can be used.

Carbon steel and alloy steel for machine structure are inexpensive as compared with other metal materials such as stainless steel, and are superior in strength and toughness. When a rubber material is kneaded, a large force is applied to the kneading rotor 1 as compared with kneading of powder or the like. However, as a result of the use of carbon steel as the base 2, the cost of the kneading rotor 1 can be suppressed, and deformation or breakage of the kneading rotor 1 during the kneading of a rubber material can be suppressed.

As common carbon steel, for example, S10C to S58C specified in JIS G 4051:2016 can be used. Specifically, it is possible to use those in which a C (carbon) content is 0.08 to 0.61%, a Si (silicon) content is 0.15 to 0.35%, a Mn (manganese) content is 0.30 to 0.60% (when the C content is 0.08 to 0.28%) or 0.60 to 0.90% (when the C content is 0.25 to 0.61%), a P (phosphorus) content is 0.030% or less, a S (sulfur) content is 0.035% or less, a Ni (nickel) content is 0.20% or less, a Cr (chromium) content is 0.20% or less, a Cu (copper) content is 0.30% or less, a total content of Ni and Cr is 0.35% or less, in % by mass, and the balance is Fe (iron) and unavoidable impurities. Among the steel grades specified in JIS G 4051:2016, S45C or S35C is preferable.

In the present embodiment, as the alloy steel for machine structure, alloy steel having a component composition specified by JIS G 4053:2016 can be used. Specifically, it is possible to use an alloy steel (chromium molybdenum steel) in which a C content is 0.13 to 0.48%, a Si content is 0.15 to 0.35%, a Mn content is 0.30 to 1.00%, a P content is 0.030% or less, a S content is 0.030% or less, a Ni content is 0.25% or less, a Cr content is 0.90% to 1.50%, a Mo (molybdenum) content is 0.15 to 0.30%, a Cu content is 0.30% or less, in % by mass, and the balance is Fe and unavoidable impurities, and for example, SCM415 to SCM445 can be used. It is also possible to use an alloy steel (nickel chromium molybdenum steel) in which a C content is 0.12 to 0.50%, a Si content is 0.15 to 0.35%, a Mn content is 0.30 to 1.20%, a P content is 0.030% or less, a S content is 0.030% or less, a Ni content is 0.40 to 4.50% or less, a Cr content is 0.40% to 3.50%, a Mo (molybdenum) content is 0.15 to 0.70%, a Cu content is 0.30% or less, in % by mass, and the balance is Fe and unavoidable impurities, and for example, SNCM220 to SNCM815 can be used. Among the steel grades specified in JIS G 4053:2016, SCM435 or SCM440 is preferable.

The padded layer 3 is provided on at least part of the surface of the base 2. The padded layer 3 is only required to be provided at a portion of the surface of the base 2 where the kneading rotor 1 comes into contact with a rubber material during kneading of the rubber material, and may not be provided at a portion of the surface of the base 2 where the padded layer 3 comes into contact with a bearing of the kneading rotor 1. The padded layer may be provided on the entire surface of the base 2.

The padded layer 3 can be formed, for example, by welding or fusing. The thickness of the padded layer 3 is not particularly specified, and can be, for example, 1 to 10 mm, and is preferably 3 to 5 mm.

The padded layer 3 is made of austenitic stainless steel. Since austenitic stainless steel is more expensive than carbon steel and the like, use of austenitic stainless steel for a kneading rotor has not been commonly performed so far. Since austenitic stainless steel is superior in corrosion resistance to carbon steel, it is possible to impart corrosion resistance to the kneading rotor 1 by providing the padded layer 3. This makes it possible to suppress corrosion of the padded layer 3 even when an acidic aqueous solution generated from a rubber material permeates a porous hard chromium plated layer 4 during kneading of the rubber material.

Austenitic stainless steel may be any steel material whose metal microstructure is of an austenitic phase at room temperature, and for example, SUS304, SUS309S or the like classified as austenitic stainless steel in Japanese Industrial Standards (JIS) can be used. In addition, austenitic stainless steel having the component composition shown in Table 1 (hereinafter, also referred to as "steel grade a") developed by the present disclosure is preferable because it is superior not only in corrosion resistance but also in abrasion resistance. When the austenitic stainless steel of steel grade a is used, the abrasion resistance of the kneading rotor 1 can be maintained even when the hard chromium plated layer 4 is peeled off due to long-term use of the kneading rotor 1.

The hard chromium plated layer 4 is provided on at least part of the surface of the padded layer 3. The hard chromium plated layer 4 is most preferably provided on the entire surface of the padded layer 3, and may also be provided on the surface of the base 2. The hard chromium plated layer 4 can impart abrasion resistance to the kneading rotor 1.

The composition, thickness, formation method, etc. of the hard chromium plated layer 4 are not particularly limited. The hard chromium plated layer 4 can be formed by, for example, an electroplating process. The thickness of the hard chromium plated layer 4 is preferably 0.1 mm or more. The thickness of the hard chromium plated layer 4 is preferably 0.3 mm or less. The Vickers hardness of the hard chromium plated layer 4 is preferably Hv600 or more, and more preferably Hv750 or more. The Vickers hardness of the hard chromium plated layer 4 is preferably Hv1500 or less, and more preferably Hv1200 or less.

For example, as illustrated in FIG. 1, the kneading rotor 1 may have a shaft portion 1a and a kneading blade 1b provided to protrude from a peripheral surface of the shaft portion 1a in a radial direction of the shaft portion 1a. In the present embodiment, three kneading blades 1b are provided on the peripheral surface of the shaft portion 1a. In this case, the padded layer 3 is preferably provided on the surface of each of the kneading blades 1b including a tip portion 1c and the peripheral surface of the portion of the peripheral surface of the shaft portion 1 a where the kneading blades 1b are provided.

The kneading rotor 1 illustrated in FIG. 1 has therein a flow channel 5 through which a coolant can flow. The flow channel 5 is provided to extend through the shaft portion 1a in an axial direction. As a result of forming the flow channel 5, the kneading rotor 1 can be cooled during kneading. Therefore, it is preferable to four the flow channel 5, but the flow channel 5 may not be formed.

Kneading Machine

Figure 2:
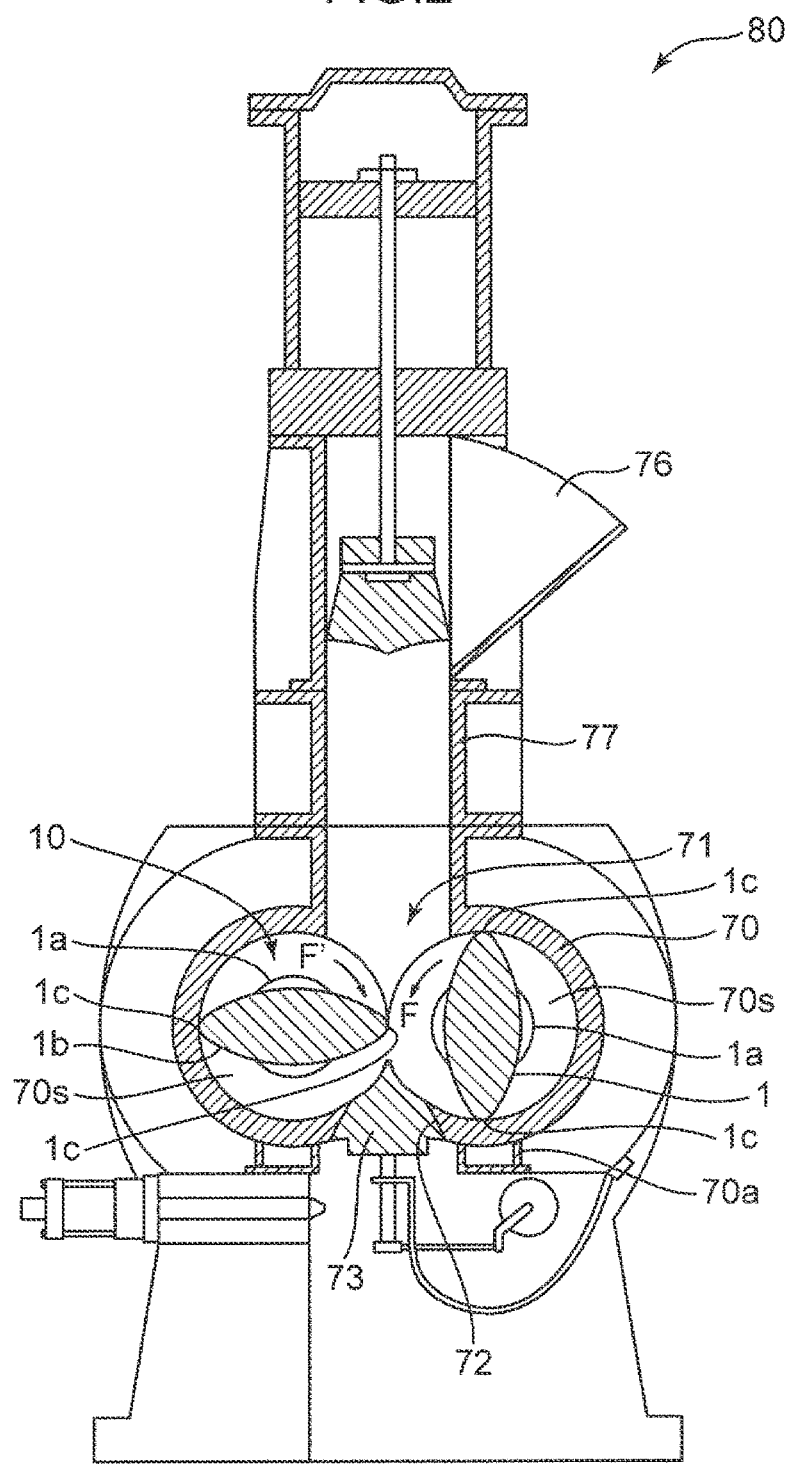
FIG. 2 is a cross-sectional view of a kneading machine according to the first embodiment.

FIG. 2 is a cross-sectional view of a kneading machine according to the present embodiment. The kneading machine 80 is an internal batch kneading machine that kneads a rubber material, and is a biaxial batch-type kneading machine. The kneading machine 80 has a casing 70, a pair of kneading rotors 10, and a material supply tube 77. The pair of kneading rotors 10 includes two kneading rotors 1 described above.

The casing 70 is a main body of the kneading machine 80 and is made of a metal material. The casing 70 is supported by a support base 70a made of metal. Two kneading chambers 70s are provided inside the casing 70. The kneading chambers 70s are formed in cylindrical shapes extending in parallel to each other.

A material supply port 71 for supplying a rubber material to be kneaded is provided in an upper portion of the casing 70, and is connected to the material supply tube 77. A material discharge port 72 for discharging a kneaded material and a lid member 73 for opening and closing the material discharge port 72 are provided in a lower portion of the casing 70. In the casing 70, the material supply port 71, the two kneading chambers 70s, and the material discharge port 72 communicate with each other.

TABLE 1

| Steel grade | Composition (% by mass), balance: Fe and unavoidable impurities | | | | | |
|---|---|---|---|---|---|---|
| | C | Si | Cr | Mo | Ni | V | W |
| a | 0.04-0.15 | 0.50 or less | 15.00-21.00 | 0.05-2.20 | 8.50-11.50 | 0.05-010 | 0.20 or less |

One kneading rotor 1 is disposed in each of the two kneading chambers 70s. The kneading rotors 1 are powered by motors, not shown, and rotate in mutually opposite directions about the shaft portions 1a (in directions of arrows F and F in FIG. 2). The rotation direction of each of the kneading rotors 1 is a direction in which the rubber material supplied through the material supply tube 77 to the kneading chamber 70s is discharged to the material discharge port 72.

The material supply tube 77 vertically extends on the upper portion of the casing 70, and the internal space of the material supply tube 77 is continuous with the material supply port 71. In the kneading machine 80, a hopper 76 for supplying a rubber material from the outside is provided in an upper portion of the material supply tube 77.

Since the kneading machine 80 according to the present embodiment includes the kneading rotor 1 superior in corrosion resistance and abrasion resistance, a rubber material can be stably kneaded for a long period of time.

The kneading machine 80 according to the present embodiment includes two kneading rotors 1 illustrated in FIG. 1. In the present embodiment, the kneading rotors 1 are intermeshing rotors arranged adjacent to each other such that the kneading blades 1b intermesh with each other. However, the kneading rotors 1 may be tangential rotors arranged such that tip portions 1c of the kneading blades 1b are in contact with each other. In the kneading rotor 1 illustrated in FIGS. 1 and 2, the tip portion 1c of the kneading blade 1b refers to a constant diameter portion having a constant outer diameter (a portion constituting an arc having the same radius about the rotation axis on an outer peripheral surface of the kneading blade 1b). Since the kneading machine 80 according to the present embodiment can employ both an intermeshing rotor and a tangential rotor, it can cope with kneading of various rubber materials.

The kneading machine 80 according to the present embodiment is a batch-type kneading machine. However, the kneading machine 80 according to the present embodiment may be a continuous kneading machine.

Method for Kneading Rubber Material

A method for kneading a rubber material using a kneading rotor according to the present embodiment will be described. In the kneading method according to the present embodiment, a kneading rotor 1 having therein a flow channel 5 through which a coolant can flow is used. The kneading rotor 1 may be an intermeshing rotor or a tangential rotor.

In the method for kneading a rubber material according to the present embodiment, a rubber material containing silane and a silane coupling agent is used, and the rubber material is kneaded while a coolant is made to flow through the flow channel 5.

More specifically, using a kneading machine 80 including a kneading rotor 1 having a flow channel 5, a rubber material containing silane and a silane coupling agent is supplied from a hopper 76 of the kneading machine 80. The rubber material supplied is supplied into a kneading chamber 70s from a material supply port 71 through a material supply tube 77, and is kneaded by the kneading rotor 1 rotating with a coolant flowing through the flow channel 5. The rubber material kneaded by the kneading rotor 1 is discharged downward from a material discharge port 72.

In the kneading method according to the present embodiment, since the rubber material containing silica is kneaded, an acidic aqueous solution may be generated in the rubber material due to moisture contained in the silica. However, in this kneading method, since the kneading rotor 1 is used, corrosion of a padded layer 3 can be suppressed even if the acidic aqueous solution permeates a chromium plated layer 4.

Further, in the kneading method according to the present embodiment, kneading can be performed while cooling the kneading rotor 1 with a coolant flowing through the flow channel 5. For this reason, degradation of the rubber material and the kneading rotor 1 due to overheating during kneading can be suppressed. As a cause of degradation of the kneading rotor 1 due to overheating, distortion occurs between the base 2, the padded layer 3, and the hard chromium plated layer 4 constituting the kneading rotor 1 in an overheated state due to the difference in coefficient of thermal expansion among those parts.

As described above, by the kneading method according to the present embodiment, degradation of the kneading rotor 1 can be suppressed, and a rubber material can be stably kneaded for a long period of time.

Method for Manufacturing Kneading Rotor

A method for manufacturing a kneading rotor 1 for a kneading machine 80 according to the present embodiment will be described with reference to FIG. 1.

As shown in FIG. 1, the method for manufacturing a kneading rotor 1 according to the present embodiment is a method in which a padded layer 3 made of austenitic stainless steel is formed on at least part of a surface of a base 2 made of carbon steel or alloy steel for machine structure by welding or fusing, and a hard chromium plated layer 4 having a thickness of 20 μm or more and a Vickers hardness of Hv750 or more is formed on at least part of a surface of the padded layer 3 by an electroplating process. By this method, a kneading rotor 1 superior in corrosion resistance and abrasion resistance can be obtained.

Second Embodiment

Kneading Rotor

Figure 3:
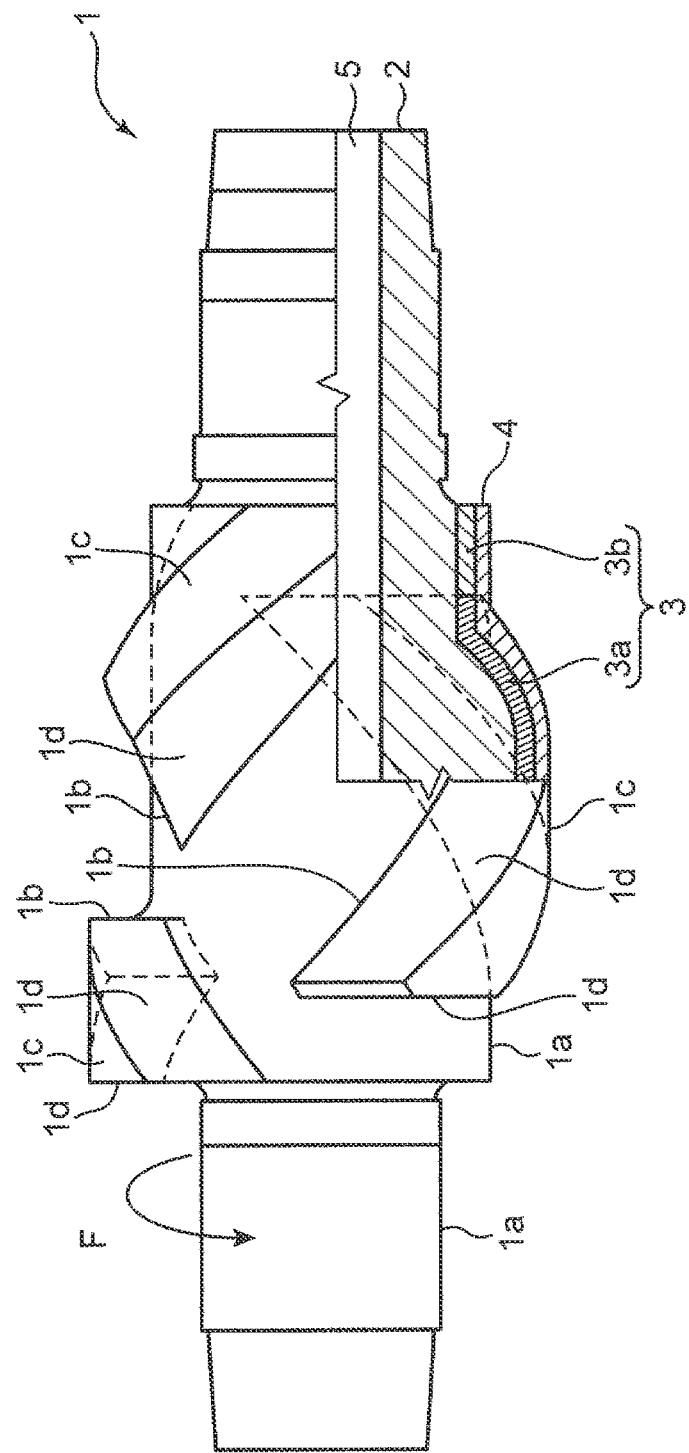
FIG. 3 is a partial cross-sectional view of a modified example of a kneading rotor according to a second embodiment of the present disclosure.

Next, a second embodiment of the present disclosure will be described. FIG. 3 is a partial cross-sectional view of a kneading rotor according to the present embodiment. In FIG. 3, constituent elements substantially the same as the constituent elements illustrated in FIG. 1 are denoted by the same reference numerals, and the description thereon will be omitted below.

The kneading rotor 1 according to the present embodiment differs from the kneading rotor according to the first embodiment in the configuration of the padded layer 3, and has the same configuration as the kneading rotor 1 according to the first embodiment except for this point. The padded layer 3 of the kneading rotor 1 according to the first embodiment is entirely made of austenitic stainless steel. In contrast, the padded layer 3 of the kneading rotor 1 according to the present embodiment has a first padded layer 3a made of Stellite on at least a tip portion 1c of a kneading blade 1b in a surface of a base 2, and has a second padded layer 3b made of austenitic stainless steel on a portion other than the tip portion 1c.

The region of the surface of the base 2 on which the padded layer 3 combining the first padded layer 3a and the second padded layer 3b according to the present embodiment is provided is similar to that of the padded layer 3 according to the first embodiment.

Since Stellite is superior in corrosion resistance, the corrosion resistance of the kneading rotor 1 can be further improved by providing the first padded layer 3a made of Stellite.

The first padded layer 3a is preferably provided on a side surface 1d of the kneading blade 1b in addition to the tip portion 1c of the kneading blade 1b. When the kneading rotor 1 is an intermeshing rotor, the first padded layer 3a is more preferably provided on a portion of the peripheral surface of the shaft portion 1a where the kneading blade 1b is provided.

In the kneading rotor 1 according to the present embodiment, the amount of Stellite to be used can be reduced as compared with the case where the entire padded layer 3 is Stellite. In addition, austenitic stainless steel is less expensive than Stellite. For this reason, the kneading rotor 1 according to the present embodiment is inexpensive and safer than a case where the entire padded layer 3 is made of Stellite.

The kneading rotor 1 according to the present embodiment illustrated in FIG. 3 also has therein a flow channel 5 through which a coolant can flow, but the flow channel 5 may not be provided as in the case of the kneading rotor according to the first embodiment. The kneading rotor 1 according to the present embodiment can also be applied to the kneading machine according to the first embodiment described above.

Method for Manufacturing Kneading Rotor

The method for manufacturing a kneading rotor according to the present embodiment is the method for manufacturing a kneading rotor according to the first embodiment, in which as shown in FIG. 3, a first padded layer 3a made of Stellite is formed by welding or fusing on at least a surface of a tip portion 1c of a kneading blade 1b of the kneading rotor 1, a second padded layer 3b made of austenitic stainless steel is formed by welding or fusing on a portion excluding the tip portion, and a hard chromium plated layer 4 is formed on at least part of the second padded layer 3b or the first padded layer 3a. By this method, a kneading rotor 1 having further improved corrosion resistance can be obtained.

The present specification discloses the techniques of various aspects as described above, and the main techniques among them are summarized below.

As described above, the kneading rotor according to one aspect of the present disclosure is a kneading rotor for a kneading machine, comprising a base made of carbon steel or alloy steel for machine structure, a padded layer made of austenitic stainless steel on at least part of a surface of the base and has a hard chromium plated layer on at least part of a surface of the padded layer.

With this configuration, an inexpensive and safe kneading rotor superior in corrosion resistance and abrasion resistance can be obtained.

The kneading rotor having the above configuration may be one in which the kneading rotor has a kneading blade, a padded layer made of Stellite (registered trademark) on at least a tip portion of the kneading blade, and a padded layer made of austenitic stainless steel on a portion excluding the tip portion.

With this configuration, a kneading rotor having further improved corrosion resistance can be obtained.

In the kneading rotor having the above configuration, the hard chromium plated layer may have a thickness of 20 μm or more and a Vickers hardness of Hv750 or more.

With this configuration, a kneading rotor having further improved abrasion resistance can be obtained.

The kneading rotor having the above configuration may have therein a flow channel through which a coolant is allowed to flow.

With this configuration, the kneading rotor can be cooled during kneading.

A kneading machine according to another aspect of the present disclosure is a kneading machine that kneads a rubber material, and includes the kneading rotor described above.

With this configuration, since the kneading machine includes the kneading rotor superior in corrosion resistance and abrasion resistance, a rubber material can be stably kneaded for a long period of time.

In the kneading machine having the above configuration, the kneading rotor may be either an intermeshing rotor or a tangential rotor.

With this configuration, a kneading machine capable of coping with kneading of various rubber materials can be obtained.

A method for kneading a rubber material according to another aspect of the present disclosure is a method for kneading a rubber material using the kneading rotor described above, wherein the rubber material contains silica and a silane coupling agent, and the rubber material is kneaded while a coolant is made to flow through the flow channel.

With this configuration, degradation of the kneading rotor due to overheating can be suppressed, and a rubber material can be stably kneaded for a long period of time.

A method for manufacturing a kneading rotor according to another aspect of the present disclosure is a method for manufacturing a kneading rotor for a kneading machine, the method comprising forming a padded layer made of austenitic stainless steel on at least part of a surface of a base made of carbon steel or alloy steel for machine structure by welding or fusing, and forming a hard chromium plated layer having a thickness of 20 μm or more and a Vickers hardness of Hv750 or more on at least part of a surface of the padded layer by an electroplating process.

With this configuration, a kneading rotor superior in corrosion resistance and abrasion resistance can be obtained.

In the method for manufacturing a kneading rotor having the above configuration, the kneading rotor has a kneading blade, and the method includes forming a padded layer made of Stellite (registered trademark) on at least a surface of a tip portion of the kneading blade by welding or fusing, forming a padded layer made of the austenitic stainless steel on a portion excluding the tip portion by welding or fusing, and forming the hard chromium plated layer on at least part of the padded layer made of the austenitic stainless steel or the padded layer made of the Stellite.

With this configuration, a kneading rotor having further improved corrosion resistance can be obtained.

Hereinafter, the present disclosure will be more specifically described by way of examples; however, the present disclosure is not limited by the following examples, and can be carried out with changes within a scope that meets the gist described above and below, and such changes are all included within the technical scope of the present disclosure.

EXAMPLES

In Examples, corrosion resistance tests and abrasion resistance tests were performed using steel materials and metal materials having chemical component compositions (Nos. 1 to 4) shown in Table 2. The steel materials of No. 1 and No. 2 are austenitic stainless steel, and are examples of the present disclosure corresponding to the steel grade a shown in Table 1 described above. The steel material of No. 3 is martensitic stainless steel, and is a comparative example of the present disclosure. The metal material of No. 4 is an alloy containing cobalt as a main component (Stellite (registered trademark)), and is an example of the present disclosure. "0.00" shown in Table 1 indicates that it was less than the measurement limit. In Table 2, the values of hardness, tensile strength, and elongation of each steel material are also shown. Of the hardnesses of the steel material of No. 1, the value marked with * in the column of HRC hardness is HRB hardness.

resistance test apparatus 60 includes a rubber wheel 61 having a diameter of 220 mm, and a hopper 62 that supplies test sand 63 to between the rubber wheel 61 and a test piece 65. The test piece 65 is pressed against a substantially vertical portion of a peripheral surface of the rotating rubber wheel 61, and the test sand 63 is supplied from above the contact portion between the rubber wheel 61 and the test piece 65.

The abrasion resistance test (earth abrasion test) was performed in accordance with ASTM G65-00e1. The test conditions were as follows.

Test force (force for pressing test piece against rubber wheel): 130 N (13.3 kgf)

Rotation speed of rubber wheel: 145 rpm

TABLE 2

| Sample No. | Chemical component composition (% by mass) (The balance of Nos. 1 to 3 is Fe and unavoidable impurities, and the balance of No. 4 is Co and unavoidable impurities.) | | | | | | | Hardness | | | Tensile strength (MPa) | Elongation (%) |
|---|---|---|---|---|---|---|---|---|---|---|---|---|
| | C | Si | Cr | Mo | Ni | V | W | HS | HV | HRC | | |
| 1 | 0.09 | 0.41 | 16.85 | 0.07 | 9.86 | 0.08 | 0.12 | 25.0 | 169 | *81.7 | 519.2 | 65.20 |
| 2 | 0.04 | 0.49 | 20.87 | 2.13 | 11.32 | 0.05 | 0.00 | 27.5 | 195 | — | — | — |
| 3 | 0.27 | 0.30 | 8.15 | 0.02 | 0.08 | 0.03 | 0.00 | 51.2 | 383 | 40.8 | 1125.0 | 2.74 |
| 4 | 1.16 | 0.70 | 29.99 | 0.00 | 2.11 | 0.00 | 4.53 | 51.7 | 405 | 43.7 | 976.0 | 2.37 |

Corrosion Resistance Test

Figure 4:
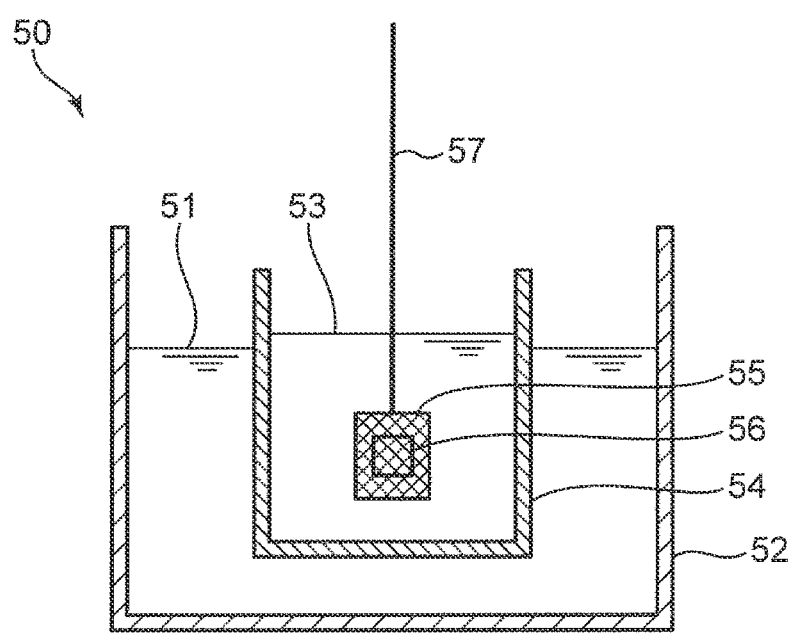
FIG. 4 is a schematic diagram of an apparatus used for a corrosion resistance test.

FIG. 4 is a schematic diagram of an apparatus used for a corrosion resistance test. As shown in FIG. 4, a corrosion resistance test apparatus 50 includes a thermostatic water bath 52 that contains warm water 51 in a state of being maintained at a prescribed temperature, and a container 54 that contains corrosive liquid 53. The container 54 is immersed in the warm water 51, and the corrosive liquid 53 is kept at a constant temperature. In the corrosion resistance test, a sample 56 wrapped in a net 55 was hung with a hanging tool 57, and immersed in the corrosive liquid for a prescribed time without touching the container 54. The test conditions were as follows.

Corrosive liquid: mixed liquid of HCl and $H_2SO_4$ (hydrogen ion ratio 1:1)

Hydrogen ion index of corrosive liquid: pH 2.0

Corrosive liquid temperature: 80° C.

Immersion time: 24 hours

The results of the corrosion resistance test are shown in Table 3.

TABLE 3

| Sample No. | Corrosion rate (mm/y) |
|---|---|
| 1 | 0.002 |
| 2 | 0.011 |
| 3 | 6.530 |
| 4 | 0.008 |

As shown in Table 3, each of the steel materials of No. 1 and No. 2 and the metal material of No. 4 of the present disclosure examples had a corrosion rate of less than 0.015 mm/y and had good corrosion resistance. The steel material of No. 3 of Comparative Example had a corrosion rate of larger than 1 mm/y and was poor in corrosion resistance.

Abrasion Resistance Test

Figure 5:
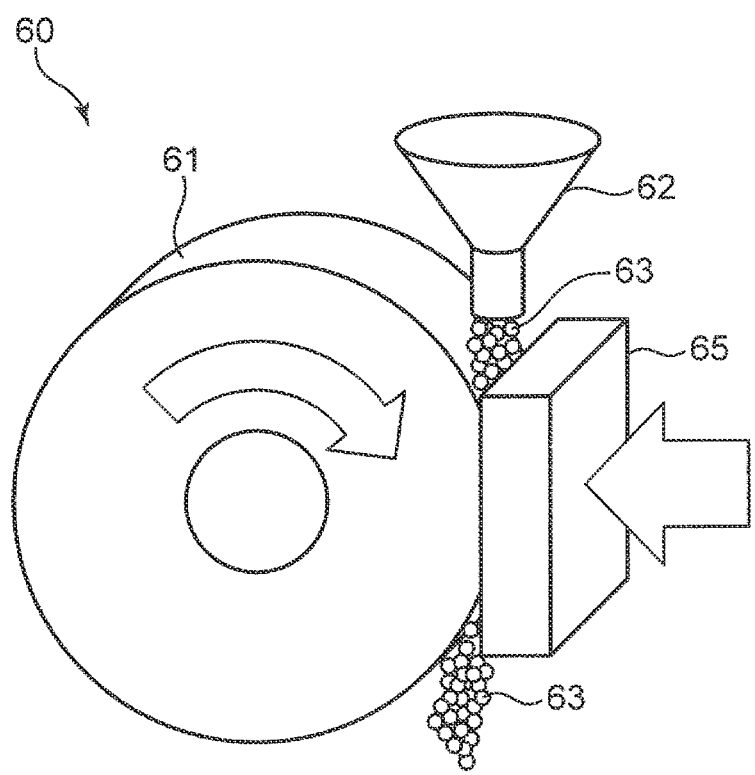
FIG. 5 is a schematic diagram of an apparatus used for an abrasion resistance test.

FIG. 5 is a schematic diagram of an apparatus used for an abrasion resistance test. As shown in FIG. 5, an abrasion Test sand flow rate: 350 g/min Test sand: quartz sand No. 6

Under the above test conditions, the test piece was pressed against the rotating rubber wheel while supplying the test sand, and the mass of the sample was measured at 2000, 4000, and 6000 rotations of the rubber wheel. An abrasion loss was calculated by subtracting the mass of the sample measured at each number of rotations from the mass of the sample in the initial state. The abrasion resistance test was performed on the steel materials of Nos. 1 and 3 and the metal material of No. 4.

The results of the abrasion resistance test are shown in Table 4.

TABLE 4

| Sample No. | Abrasion loss (g) | | |
|---|---|---|---|
| | Rotations | | |
| | 2000 | 4000 | 6000 |
| 1 | 1.76 | 3.09 | 4.34 |
| 3 | 1.32 | 2.34 | 3.28 |
| 4 | 2.51 | 4.31 | 5.74 |

As shown in Table 4, each of the steel material of No. 1 and the steel material of No. 3 had good abrasion resistance with the abrasion loss of 5 g or less at 6000 rotations. The metal material of No. 4 had an abrasion loss of more than 5 g at 6000 rotations, and was inferior in abrasion resistance to the steel material of No. 1.

Conclusion

From the above test results, it was found that the austenitic stainless steels of Nos. 1 and 2 and the Stellite (registered trademark) of No. 4 of the present disclosure examples had similar corrosion resistance and were superior in corrosion resistance to the martensitic stainless steel of No. 3. Therefore, it was found that a kneading rotor superior in corrosion resistance and abrasion resistance can be obtained by using the austenitic stainless steel and Stellite as a padded layer of the kneading rotor and providing a hard chromium plated layer on a surface of the padded layer.

Further, it was found that the austenitic stainless steel of No. 1 is superior in abrasion resistance to the Stellite (registered trademark) of No. 4. Therefore, it was found that the use of austenitic stainless steel of steel grade a as a padded layer of a kneading rotor makes it possible to obtain a kneading rotor that has superior corrosion resistance and can maintain abrasion resistance even when the hard chromium plated layer is peeled off.

This application is based on Japanese Patent application No. 2021-075811 filed in Japan Patent Office on Apr. 28, 2021, the contents of which are hereby incorporated by reference.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A kneading machine for kneading a rubber material, the kneading machine including a kneading rotor, the kneading rotor comprising:
   a base made of carbon steel or alloy steel for machine structure,
   a padded layer made of austenitic stainless steel on at least part of a surface of the base, and
   a hard chromium plated layer on at least part of a surface of the padded layer.

2. The kneading machine according to claim 1, wherein the kneading rotor has:
   a kneading blade,
   a padded layer made of Stellite (registered trademark) on at least a tip portion of the kneading blade, and
   the padded layer made of austenitic stainless steel on a portion excluding the tip portion.

3. The kneading machine according to claim 1, wherein the hard chromium plated layer has a thickness of 20 μm or more and a Vickers hardness of Hv750 or more.

4. The kneading machine according to claim 1, wherein the kneading rotor has therein a flow channel through which a coolant is allowed to flow.

5. The kneading machine according to claim 1, wherein the kneading rotor is an intermeshing rotor.

6. The kneading machine according to claim 1, wherein the kneading rotor is a tangential rotor.

7. A method for kneading a rubber material using a kneading machine for kneading the rubber material, the kneading machine including a kneading rotor, wherein the kneading rotor comprises:
   a base made of carbon steel or alloy steel for machine structure,
   a padded layer made of austenitic stainless steel on at least part of a surface of the base, and
   a hard chromium plated layer on at least part of a surface of the padded layer, the kneading rotor has therein a flow channel through which a coolant is allowed to flow, the rubber material contains silica and a silane coupling agent,
   the rubber material is kneaded while a coolant is made to flow through the flow channel.

8. A method for manufacturing a kneading rotor for a kneading machine, the method comprising:
   forming a padded layer made of austenitic stainless steel on at least part of a surface of a base made of carbon steel or alloy steel for machine structure by welding or fusing, and
   forming a hard chromium plated layer having a thickness of 20 μm or more and a Vickers hardness of Hv750 or more on at least part of a surface of the padded layer by an electroplating process.

9. The method for manufacturing a kneading rotor according to claim 8, wherein
   the kneading rotor has a kneading blade,
   the method comprises:
   forming a padded layer made of Stellite (registered trademark) on at least a surface of a tip portion of the kneading blade by welding or fusing,
   forming the padded layer made of the austenitic stainless steel on a portion excluding the tip portion by welding or fusing, and
   forming the hard chromium plated layer on at least part of the padded layer made of the austenitic stainless steel or the padded layer made of the Stellite.

* * * * *